Dec. 6, 1960 G. H. TOWNER 2,963,660

SIGNAL FREQUENCY CONVERTER

Original Filed April 2, 1954 2 Sheets-Sheet 1

INVENTOR:
George H. Towner
By Herbert E. Metcalf
His Patent Attorney

Dec. 6, 1960 G. H. TOWNER 2,963,660

SIGNAL FREQUENCY CONVERTER

Original Filed April 2, 1954 2 Sheets-Sheet 2

INVENTOR
George H. Towner
By Herbert E. Metcalf
His Patent Attorney

United States Patent Office 2,963,660

Patented Dec. 6, 1960

2,963,660

SIGNAL FREQUENCY CONVERTER

George H. Towner, San Diego, Calif., assignor to Northrop Corporation, a corporation of California Original application Apr. 2, 1954, Ser. No. 420,644, now Patent No. 2,817,062, filed Dec. 17, 1957. Divided and this application July 12, 1957, Ser. No. 671,639

4 Claims. (Cl. 332—52)

This invention relates to frequency conversion means and, more particularly, to a frequency converting circuit especially suited for servo work, and is a division of my prior copending application Serial No. 420,644, filed April 2, 1954, now Patent No. 2,817,062, issued December 17, 1957.

In electronic art, applications of frequency conversion means are manifold, as in the operation of low frequency servo motors from an error signal of a higher frequency, for example, or in the adaptation of different frequency precision instruments to a central frequency source. Prior means for signal frequency conversion as mixed type converters and ordinary modulators and their demodulators, for example, presented problems of undersired time lag introduced into the output, circuit complexity and poor reliability for use in servo systems.

It is, accordingly, an object of this invention to provide a frequency conversion circuit that is simple in construction, reliable in operation and which causes a minimum amount of inherent time lag (delay) to an input signal.

It is a further object of this invention to provide a frequency conversion circuit which prevents input quadrature signal components from appearing in the output as quadrature signals of the new frequency.

Briefly, the present invention comprises two diodes connected in series across a center-tapped secondary winding of a transformer. The center tap is connected to ground, and the junction of the two diodes is resistively connected to an input signal source. A first reference voltage of input signal frequency and a second reference voltage of output frequency are connected in series with the primary winding of the transformer. The two diodes serve effectively as switches, their conduction status being governed by the reference frequencies which modulate the input signal. An output signal is derived across a resistance which is serially coupled by a capacitance to the junction of the two diodes. This output signal is converted into a sine wave by means of a resonant circuit in the plate circuit of an amplifier tube connected across the resistance.

Other features and objects of the invention will be more clearly recognized from reference to the following specification and accompanying drawings in which.

Figure 1:
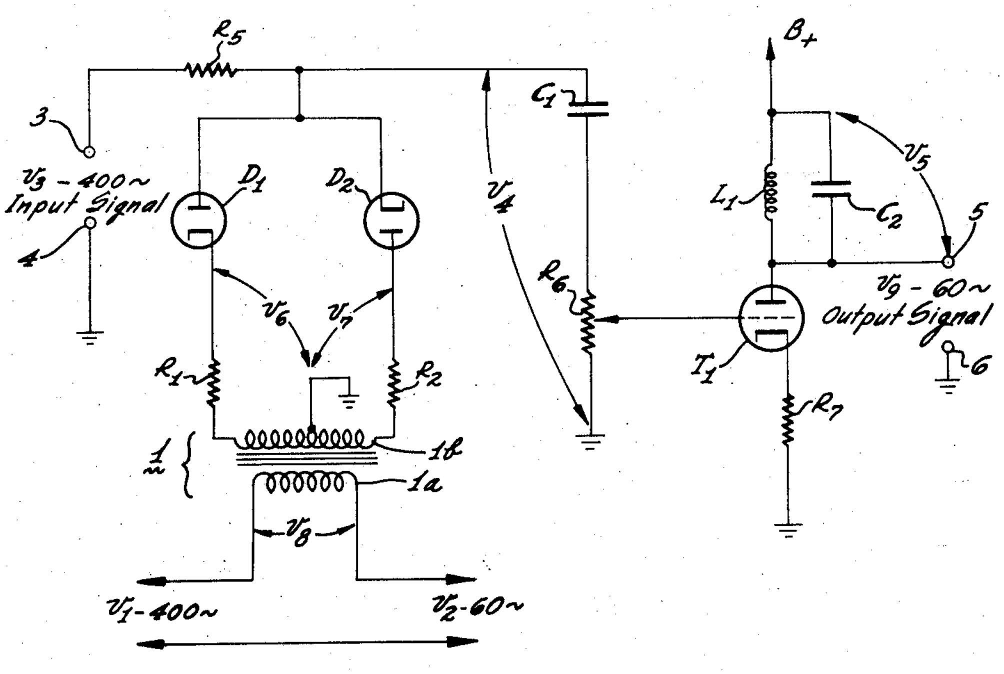
Figure 1 is a circuit diagram of a preferred embodiment of the present invention.

Reference is first made to the circuit diagram of Figure 1. A transformer 1 has a primary 1*a* connected in series with a first voltage $v_1$ and a second voltage $v_2$. Voltage $v_1$ is a reference voltage from a 400 c.p.s. voltage source, and voltage $v_2$ is another reference voltage from a 60 c.p.s. voltage source. The two series-connected voltages $v_1$ and $v_2$ are equal in magnitude. Transformer 1 has a secondary winding 1*b* with a center tap grounded as shown.

An input signal $V_3$ is provided at input terminals 3 and 4, of which terminal 4 can be connected to ground. Input signal $v_3$ is a 400 c.p.s. signal which can vary in magnitude and is to be converted into a 60 c.p.s. output signal. This output signal ($v_9$) is the result of only those input signal components which are in phase with the 400 c.p.s. reference frequency, because input quadrature signal components are suppressed from the output by means of two diodes $D_1$ and $D_2$ connected effectively as discriminating switches. The plate of $D_1$ and the cathode of $D_2$ are connected together to terminal 3 through an isolating resistance $R_5$. The cathode of $D_1$ is connected through a resistance $R_1$ to one end of transformer secondary 1*b*, while the plate of $D_2$ is connected through a resistance $R_2$ to the other end of secondary 1*b*.

The plate of $D_1$ and cathode of $D_2$ are connected to a resistance $R_6$ through a coupling capacitance $C_1$. The other end of resistance $R_6$ is connected to ground, and a tap on $R_6$ is directly connected to the grid of a tube $T_1$ as shown. Tube $T_1$ is suitably biased by cathode resistance $R_7$ and the plate of $T_1$ is connected to B+ through a coil $L_1$ which is shunted by a capacitance $C_2$ to form a resonant 60 c.p.s. circuit. Output signal $v_9$ is secured across terminals 5 and 6, terminal 5 being connected to the plate of $T_1$ and terminal 6 connected to ground.

Figure 2:
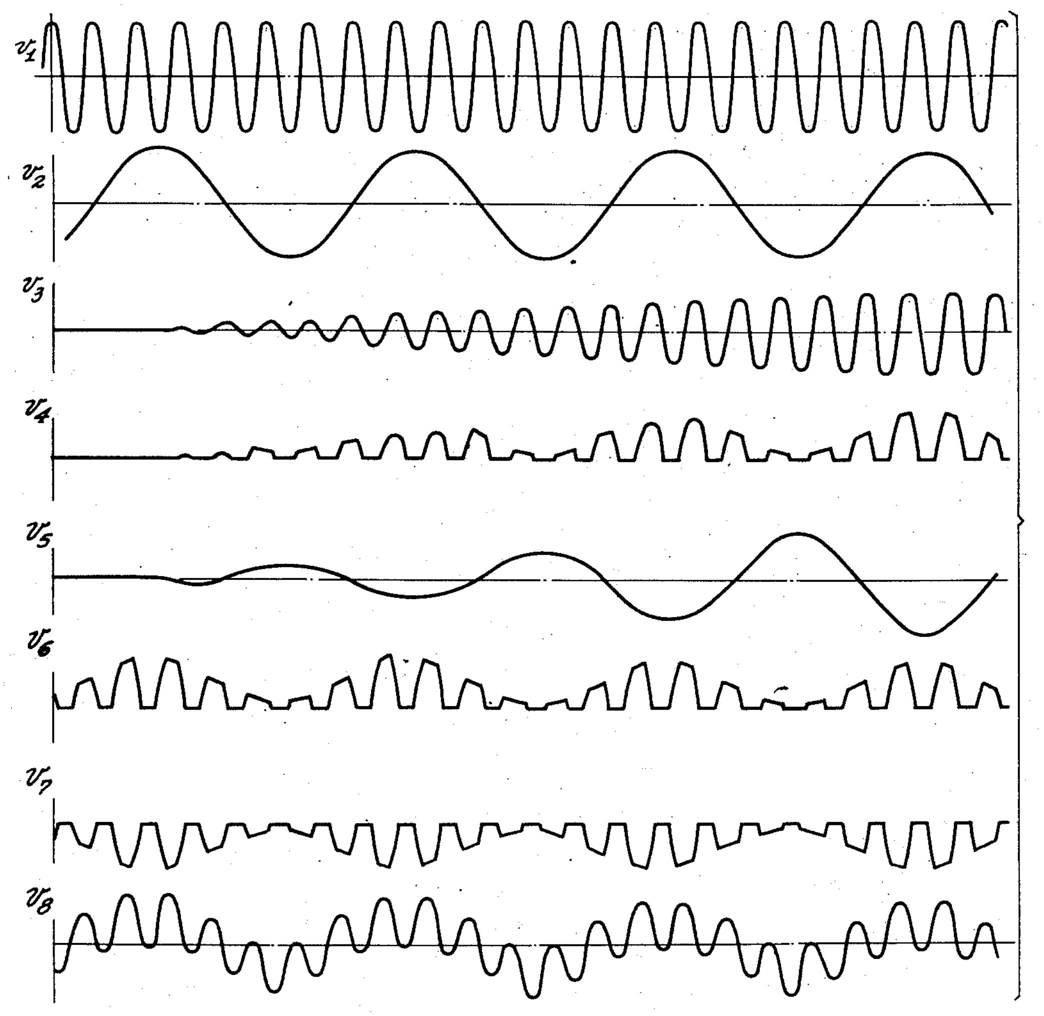
Figure 2 is a composite graph showing a series of waveforms which illustrate circuit response of the invention to a gradually increasing input signal.

In Figure 2, there are shown eight separate graphs having curves plotted on abscissas of the same time scale. The different graphs are labeled $v_1$, $v_2$, $v_3$, $v_4$, $v_5$, $v_6$, $v_7$, and $v_8$ corresponding to voltage identification on Figure 1. The first graph labeled $v_1$ shows a constant magnitude 400 c.p.s. voltage wave and the second graph $v_2$ shows a 60 c.p.s. wave of the same magnitude. The two voltages are applied in series to the primary of transformer 1. The next graph, of $v_3$, shows a linearly increasing magnitude input signal in phase with $v_1$ provided across terminals 3 and 4, this example input signal attaining a constant magnitude as indicated. With this input signal ($v_3$) impressed across terminals 3 and 4, voltage $v_4$ between the common junction of diodes $D_1$ and $D_2$ to ground takes shape as given by the fourth graph of $v_4$. A series of gradually increasing peaks appear which are cut down or limited by a 60 c.p.s. envelope of $v_2$. When the magnitude of $v_3$ is small, the full 400 c.p.s. positive peaks of $v_4$ are undisturbed around the 60 c.p.s. positive peak points of an envelope of $v_2$ superimposed on $v_4$, but are reduced to zero at the negative peak points of the envelope. Negative peaks due to $v_3$ do not appear in $v_4$ because $v_1$ is in phase with $v_3$ and the negative $v_1$ peaks on diode $D_1$ cathode cause conduction which "shorts" out these portions from appearing at $v_4$. Consequently, $v_5$ is shown as a gradually increasing magnitude 60 c.p.s. wave which is the output signal provided to, for example, an A.C. servo motor. If the 400 c.p.s. signal phase of $v_3$ is changed to 180°, the graph of $v_4$ turns upside down. The envelope of $v_4$ produces $v_5$ which, in turn, is essentially $v_9$.

The sixth graph, labeled $v_6$, is a plot of voltage between the cathode of $D_1$ and ground. A series of positive 400 c.p.s. peaks, limited by a 60 c.p.s. envelope, exists as shown. Similarly, the voltage waveform appearing between the plate of $D_2$ and ground is as shown in the following graph for $v_7$. The waveform $v_7$ is identical to $v_6$ except that the 400 c.p.s. peaks are negative and are limited by a 60 c.p.s. envelope below the abscissa. The last graph of Figure 2 is labeled $v_8$ and illustrates the superimposition of $v_1$ on $v_2$. This voltage $v_8$ is identified as the waveform across primary 1*a* but can represent the waveform for the transformed voltage across the secondary 1*b*.

Figure 3:
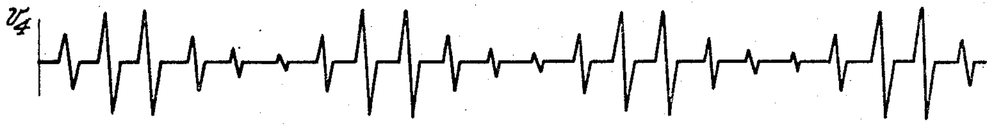
Figure 3 is a graph showing a waveform illustrating circuit output to a constant amplitude quadrature input signal.

A necessary requirement for a diode to conduct current is that the plate thereof be at a sufficiently higher positive voltage than the corresponding cathode. Careful examination of the circuit diagrams will reveal that this condition occurs during the times that $v_6$ and $v_7$ (Figure 2) are zero (spaces between pulses on the abscissa). To illustrate how quadrature signals in the input signal can be eliminated from the output, assume that the input signal differs by 90 degrees with the reference 400 c.p.s. signal $v_1$ and is of a constant magnitude. Thus, $v_3$ becomes a constant magnitude 400 c.p.s. signal which can lead or lag $v_1$ by 90 degrees. The output $v_4$ in Figure 3 is shown for a lagging quadrature input signal. A leading input quadrature signal would result in a reversal of the half peaks; a negative chopped peak followed directly by a positive chopped peak. The crossover point between these chopped peak pairs correspond to maximum peak points on the 400 c.p.s. reference signal $v_1$ which are separated by 360 degrees. Whether the crossover points correspond to the maximum peak points of the positive halves or the negative halves, depends simply on transformer lead connections with the 400 c.p.s. signal source. Reversal of leads would cause crossover point correspondence to change from one to the other maximum point halves. From Figure 3, it is to be noted that the average output for $\frac{1}{60}$ second or longer is zero, hence the quadrature components are eliminated from the output. Two units of the invention could be operated, properly phased, to secure full wave rectification of input signal and hence derive a more nearly sinusoidal output to a resonant circuit.

Thus, a simple circuit for frequency conversion, eliminating quadrature components, has been described. It is to be understood, however, that the invention is not limited to the specific features shown, but that the means and construction herein disclosed comprise the preferred form of putting the invention into effect, and the invention is, therefore, claimed in any of its forms or modifications within the legitimate and valid scope of the appended claims.

What is claimed is:

1. Frequency conversion means, comprising: an input adapted to receive a signal of an input frequency; a first rectifier having a plate and a cathode; a second rectifier having a plate and a cathode; a junction between the plate of said first rectifier and the cathode of said second rectifier, and means connecting said junction to one side of said input; output means connected to said junction for a signal of an output frequency; a transformer having a primary and a center-tapped secondary; a reference voltage source of said input frequency and a reference voltage source of said output frequency connected to said primary to energize the latter; means connecting the cathode of said first rectifier and the plate of said second rectifier respectively to an end of said secondary; and means connecting said center tap to the other side of said input.

2. Apparatus in accordance with claim 1 wherein said output means includes tuned circuit means tuned only to said output frequency, whereby a true sine wave may be produced.

3. Frequency conversion means, comprising: a pair of input terminals for receiving a signal at an input frequency to be converted to an output signal of a desired output frequency different from said input frequency; a first rectifier having an anode and a cathode; a second rectifier having an anode and a cathode, the anode of said first rectifier connected to the cathode of said second rectifier at a common junction point; an input impedance connected from one of said input terminals to said common junction point; an output circuit from which the output signal is taken, connected from said junction point to the second of said input terminals; a transformer having a primary and a center-tapped secondary; a reference voltage source of input frequency and a reference voltage source of output frequency connected in series with said transformer primary; a first resistance connecting the cathode of said first rectifier to one end of said transformer secondary; a second resistance connecting the anode of said second rectifier to the other end of said transformer secondary; and means connecting the center tap of said secondary to said second input terminal.

4. Apparatus in accordance with claim 3 including an amplifier operatively connected to said output circuit, and a resonant network in the output of said amplifier, said network being resonant at said output frequency for obtaining a sine wave output signal.

References Cited in the file of this patent

UNITED STATES PATENTS

| | | |
|---|---|---|
| 2,244,799 | Paddle | June 10, 1941 |
| 2,304,135 | Wise | Dec. 8, 1942 |
| 2,446,188 | Miller | Aug. 3, 1948 |
| 2,486,076 | Strutt et al. | Oct. 25, 1949 |
| 2,608,650 | Myers | Aug. 26, 1952 |
| 2,799,829 | Gordon et al. | July 16, 1957 |

FOREIGN PATENTS

| | | |
|---|---|---|
| 143,258 | Sweden | Dec. 15, 1953 |
| 2,357,499 | Great Britain | 1931 |